United States Patent

McLaren

[15] 3,648,756
[45] Mar. 14, 1972

[54] COMPOSITE MOLD AND METHOD OF MAKING SAME

[72] Inventor: Reginald J. McLaren, Southfield, Mich.
[73] Assignee: Eaton Corporation
[22] Filed: May 4, 1970
[21] Appl. No.: 34,405

[52] U.S. Cl. ..................... 164/23, 164/137, 164/364
[51] Int. Cl. ........................... B22c 9/12, B22d 31/04
[58] Field of Search .................. 164/137, 364, 23, 24

[56] References Cited

UNITED STATES PATENTS

| | | | |
|---|---|---|---|
| 3,554,271 | 1/1971 | Goss | 164/137 |
| 3,346,039 | 10/1967 | Lyons | 164/338 |
| 2,976,588 | 3/1961 | Amala et al | 164/24 |
| 2,748,435 | 6/1956 | Hackett | 164/23 |
| 3,204,303 | 9/1965 | Chandley | 164/23 |

*Primary Examiner*—Robert D. Baldwin
*Assistant Examiner*—Jonn E. Roethel
*Attorney*—Harness, Dickey & Pierce

[57] ABSTRACT

A composite refractory mold suitable for casting molten metals comprising a plurality of individual mold sections which are assembled in appropriate registry, collectively defining a mold cavity of the desired configuration, and which are maintained in appropriate aligned registration by means of a refractory potting composite encapsulating the exterior of the assembled mold sections and disposed in interlocking engagement therewith.

13 Claims, 1 Drawing Figure

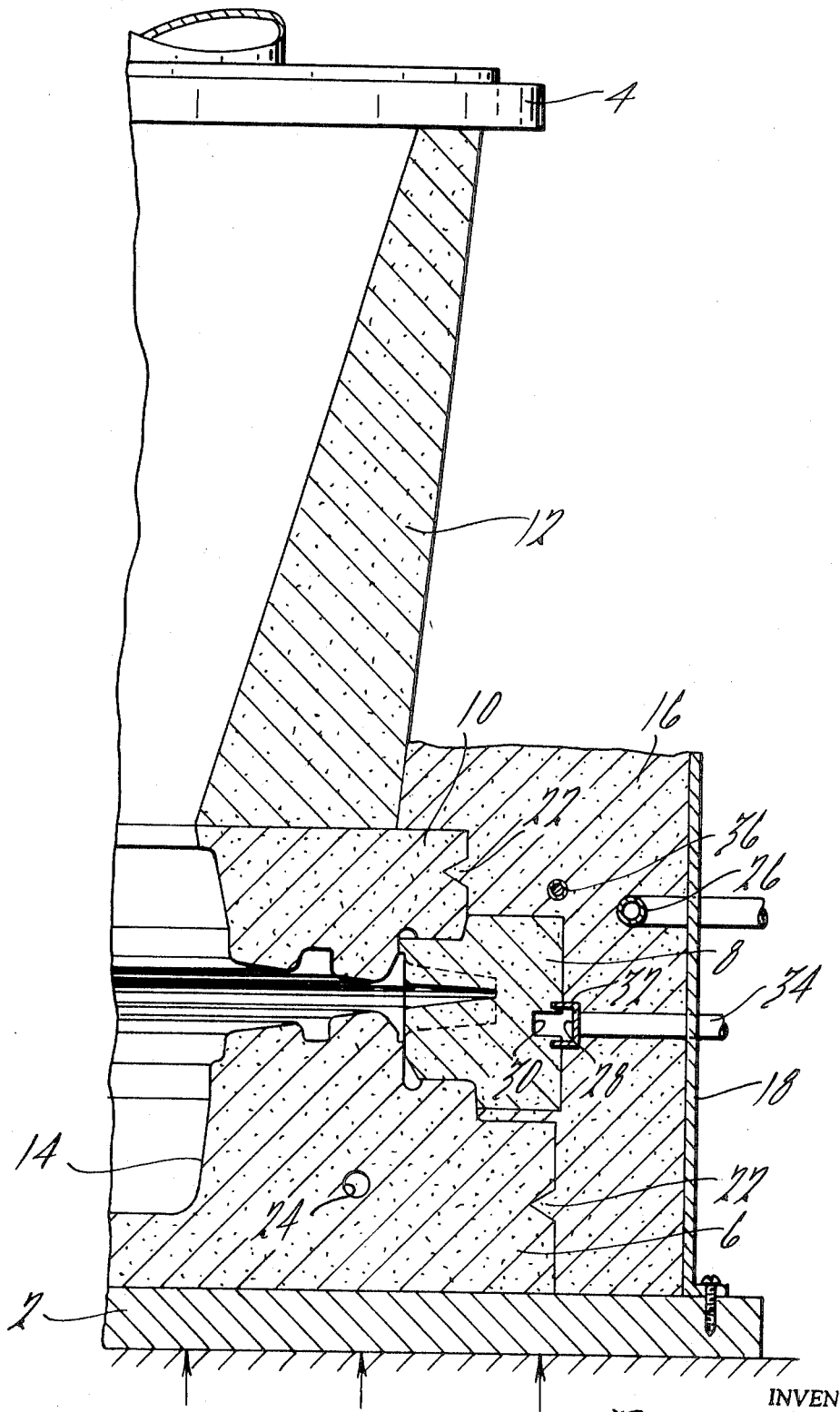

COMPOSITE MOLD AND METHOD OF MAKING SAME

BACKGROUND OF THE INVENTION

Investment casting processes utilizing refractory-type molds are in widespread commercial use in the manufacture of precision-type castings which require only minimal final machining operations. Such refractory-type molds conventionally are comprised of a particulated silica or other ceramic material which are tenaciously bonded into a refractory matrix by means of a suitable organic or inorganic binding agent. In many instances, the complexity of the part to be cast necessitates the use of two or more mold sections which, upon assembly, collectively define a mold cavity of the desired size and configuration. It has been conventional foundry practice, when working with molds comprised of a plurality of assemblable sections, to employ suitable metal clamping fixtures to retain the several sections in appropriate registration during the mold pre-heating, as well as metal pouring operations. Problems have been encountered as a result of this prior art practice due to the different coefficients of expansion between the metal clamping fixtures and the refractory compositions of which the mold sections are comprised, resulting in a loss of clamping pressure during pre-heating of the molds generally to temperatures of from about 1,000° to about 1,300° F. preparatory to pouring, which frequently results in a displacement and/or misalignment of one or more mold sections, resulting in an inaccuracy of the cast article. Attempts to retighten such metallic clamping fixtures at the completion of the pre-heating cycle have not been successful in eliminating mold section misalignment. This problem has been further aggravated as a result of the gradual distortion of such clamping fixtures as a result of the repeated heating and cooling cycles to which they are subjected during use, further detracting from their ability to maintain the several mold sections in proper aligned relationship.

In accordance with the practice of the present invention, the several individual mold sections are assembled in accurate registration and thereafter are encapsulated with a material having a similar coefficient of expansion and contraction, producing thereby a composite mold in which the individual mold sections are maintained in proper registration regardless of the pre-heat temperature to which they are subjected and the stresses imposed thereon during the metal pouring operation.

SUMMARY OF THE INVENTION

The benefits and advantages of the present invention are achieved by a composite mold which is comprised of a plurality of individual mold sections composed of a refractory material which are arranged in aligned assembled relationship and collectively define a mold cavity having the requisite configuration. The assembled individual mold sections are encapsulated within a surrounding casing, also of a refractory material, having a coefficient of thermal expansion similar to that of which the individual mold sections are comprised, and which casing is disposed in supporting and interlocking engagement with the assembled mold sections, maintaining them in appropriate registry during the pre-heating and pouring operations, as well as during their handling. The use of the refractory casing obviates the need for employing auxiliary clamping fixtures and further enables the use of individual mold sections which are of reduced cross section in view of the support provided by the casing disposed in interlocking supporting relationship therewith.

The invention further contemplates the method of making such composite molds, as well as the method of making cast articles utilizing such composite molds, including composite molds formed with one or a plurality of channels or ports extending therethrough, through which a suitable fluid is adapted to be circulated in heat exchanging relationship with the composite mold for extracting heat from or supplying heat to selected sections thereof adjacent to the mold cavity. The present invention is applicable to a variety of molds comprised of various refractory-type materials and further contemplates the utilization of aggregates of refractory material derived from scrap molds or formerly used molds for combination with additional refractory material and supplemental binder to form a flowable hardenable mixture for forming the casing of the refractory composite mold.

Additional benefits and advantages of the present invention will become apparent upon a reading of the description of the preferred embodiments taken in conjunction with the accompanying drawing.

BRIEF DESCRIPTION OF THE DRAWING

The drawing comprises a side elevational view, partly in section and partly schematic, illustrating a typical three-piece sectional mold including a pouring cup encapsulated within a refractory potting material.

DESCRIPTION OF THE PREFERRED EMBODIMENTS now in detail to the drawing, a typical arrangement is illustrated for producing a composite mold in accordance with the preferred embodiments of the present invention. The drawing further illustrates the apparatus employed in making the composite mold including a suitable press comprising a base 2 and a head 4, between which the individual mold sections are disposed in assembled clamped relationship. The mold sections include a drag section 6, a center mold section 8, a cope 10 and a pouring cup 12, which are disposed in nested aligned relationship defining a cavity 14 of a configuration suitable for casting turbine wheels. As will be noted in the drawing, the central portion of the cavity 14, as defined by the cope and drag mold sections, defines the hub portion of a wheel, while the individual turbine vanes are defined by a plurality of axially extending cavities formed in the central center mold section 8 which are disposed in communication with the main mold cavity. The parting lines of the individual mold sections are preferably formed with a stepped contour, as shown in the drawing, so as to provide for interlocking nested alignment between the several mold sections, minimizing inadvertent displacement thereof.

The individual mold sections are independently and separately prepared in accordance with any one of the various mold fabricating techniques well known in the art. The specific type of refractory material employed and the manner by which the mold section is prepared will be determined upon consideration of the type metal to be poured, as well as the dimensional accuracy necessary in the final cast article. The attainment of the desired surface contour in the mold sections can be achieved by employing permanent, semipermanent as well as expendable patterns against which the refractory material is applied while in a formable condition and whereafter it is subsequently hardened into a shape-retaining refractory mass. For this purpose, any one of a variety of refractory-type materials can be satisfactorily employed for forming the individual mold sections, as well as for forming a casing, indicated at 16, for encapsulating the exterior of the several mold sections forming an integral composite structure. Most typically, the refractory substances comprise metal oxides and silicates, such as alumina silicate, magnesia, clay, fused alumina, powdered silica, zirconium dioxide, zirconium silicate, mullite, sillimanite, etc., which are further characterized as being of a type that are chemically inert to or compatible with the molten metal to be cast in the resultant mold. The foregoing refractory materials are in a free-flowing particulate form and are of a particle size or mixture of particle sizes which are controlled in order to produce a resultant mold of the desired surface finish and accuracy. Ordinarily, the particle size of such refractory particles are controlled to a size of less than about 6 mesh (U.S. Standard Series of Screens) and may range downwardly to average particle sizes of less than about 200 mesh.

In addition to the refractory particles, the molding mixture incorporates any one of a variety of bonding agents of the types well known in the art to effect a tenacious bonding of the refractory grains into an integral high-strength refractory matrix. Among the binding agents that can be satisfactorily employed for this purpose are inorganic binding agents which include phosphates and inorganic silicates of which sodium silicate and potassium silicate in the form of aqueous sols are most common. Usually the binding agent comprises an organic-type compound including organic silicates such as the lower alkyl silicates, of which methyl and ethyl silicate are most typical. The organic silicate is employed in combination with water to effect a hydrolysis thereof along with a suitable gelling agent which is of an acidic nature. During the gelation of the binder, alcohol is formed from the alkyl constituent in the organic silicate used, which subsequently is removed from the green mold. It is also conventional to employ a prehydrolyzed organic silicate, such as methyl or ethyl silicate, in combination with distilled water and a mutual solvent, such as a lower alkyl alcohol of which methyl, ethyl and propyl alcohol are typical, as well as a gelling agent, forming an aqueous organic solution which is uniformly admixed with the refractory particles. The mixture is formed so as to provide a suitable slurry or paste which can readily be applied to the surface of a pattern, assuring intimate contact therewith and providing a resultant mold having a surface which is an exact replica of the pattern configuration. The bonding agent progressively gells, whereby the volatile alcohol constituent is evolved resulting in a green mold section which is of sufficient strength enabling its stripping from the pattern, whereafter it is heated to an elevated temperature, such as in a muffle furnace or by a direct flame, to effect a fusion of the refractory particles forming an integral, high-strength thermal shock resistant refractory mold matrix.

Regardless of the particular refractory composition and/or technique used for forming the individual assemblable mold sections, the individual sections as shown in the drawing are arranged in appropriate aligned relationship so as to form or collectively define a mold cavity of the requisite size and configuration. In the specific example illustrated in the drawing, the mold is further provided with the pouring cup 12 to facilitate the pouring of the molten metal into the cavity. It will be appreciated that composite molds made in accordance with the practice of the present invention can also be satisfactorily prepared without such pouring cups forming an integral section thereof.

The individual mold sections, as shown in the drawing, are placed on the face press 2 and upon proper alignment, are clamped by means of the press head 4 to prevent inadvertent relative movement therebetween. A flask 18 is placed in spaced encircling relationship around the assembled mold sections defining a cavity which thereafter is filled with a refractory potting material forming the casing 16 which is of the same or of a similar coefficient of thermal expansion and contraction as the material of which the individual mold sections are comprised. It is usually convenient to employ the same refractory composition as is employed for forming the individual mold sections. In order to provide for further economies in the fabrication of such composite molds, it is convenient to employ aggregates derived from the comminution of scrap mold sections and liners which serve as extenders and are admixed with fresh refractory particles and binders, forming a free-flowing mixture which can readily be poured in the annular chamber defined by that space between the periphery of the assembled mold sections and the inner surface of the flask 18. The individual mold sections are maintained in appropriate clamped relationship during the solidification of the refractory potting material until such time that it attains adequate strength to retain the individual mold sections in permanent relative alignment. When the individual mold sections are comprised of an organic silicate bonded refractory matrix and a similar composition is employed for making the potting material, the individual mold sections can be retained in the green state and a firing thereof effected concurrently with the firing of the gelled potting material, providing for further versatility and economy in the practice of the present invention.

As will be noted in the drawings, the peripheral portions of the mold sections can be provided with various surface irregularities including projections or V-shaped grooves such as indicated at 22 to enhance the interlocking engagement between the solidified potting material and the individual mold sections, effecting a further rigidification thereof. It is also contemplated, as shown in the drawing, that one or more of the individual mold sections or the potting composition itself can be provided with suitable conduits or channels which are adapted subsequently to be connected to a supply of a fluid for circulating a heat exchange fluid therethrough to effect the extraction of heat or the supply of heat to the surfaces of the mold cavity providing a desired rate of cooling and/or temperature differential therealong. As an example, the drag section 6 of the composite mold can be formed with a circular channel 24 as incorporated by an investment of the drag section during its fabrication which is adapted to be disposed in communication with a suitable conduit (not shown) for circulating a fluid therethrough in heat exchange relationship preparatory to, during and/or after the casting of a molten metal in the main cavity 14 of the composite mold.

Alternatively, a pre-formed conduit, such as the conduit 26, can be embedded directly in the potting material defining the casing 16, through which a heat transfer fluid can be circulated for attaining the desired heating and/or cooling effects in the composite mold. It is also contemplated that a channel, such as the channel 28, can be formed at the parting line between the periphery of a mold section and the potting material by forming a suitable groove such as the square-shaped groove 30 extending around the periphery of the center mold section 8, over which a U-shaped member 32 is disposed in sealing relationship, defining therebetween the channel 28 which is of a substantially rectangular cross section. The interior of the channel 28 is suitably connected, such as by means of a pipe 34, to a source of heat transfer fluid. In a similar manner, suitable heating elements, such as electrical resistant wires 36, can be embedded within the potting material or can be wrapped around the periphery of the individual mold sections prior to the pouring of the potting material, enabling an electric pre-heating of the mold sections or providing for a controlled temperature differential between different sections of the mold so as to attain the desired rate of cooling in the cast article.

The composite mold, as shown in the drawing, after the potting material has solidified sufficiently to retain the several mold sections in proper assembled registration is extracted from between the base and head platens of the press and the flask 18, if desired, is removed from the periphery thereof. The composite mold is thereafter heated, if necessary, to achieve a final curing and/or fusion of the refractory particles into a high-strength matrix, whereafter the composite mold can be stored until ready for use and can be handled without any particular precautions due to the supporting and protecting characteristics of the encapsulating potting material. Prior to the pouring of a molten metal in the composite mold, a preheating thereof is accomplished generally to temperatures of from about 1,000° F. to about 1,300° F. to minimize the thermal shock at the initiation of the metal pouring operation. As previously indicated, when refractory materials comprised of refractory particles bonded by an organic silicate binder are used, the composite mold can be fired at a temperature usually ranging from about 1,400° to about 1,800° F. for a period of time sufficient to effect at least a partial fusion of the particles with each other, whereafter the fired mold at that pre-heated temperature can be employed and is in condition for receiving the molten metal. It will further be appreciated that the increased mass of the composite mold incorporating the refractory potting material therearound provides for an increase in the heat capacity thereof such that the molds better retain their pre-heat temperatures even if inadvertently allowed to stand for excess time periods prior to the pouring of molten metal therein. At the completion of the metal pouring operation, the casting is permitted to cool, whereafter the refractory composite mold material is removed from around the periphery of the casting in accordance with any one of the variety of techniques now practiced in the art.

While it will be apparent that the invention herein disclosed is well calculated to fulfill the objects herein stated, it will be appreciated that the invention is susceptible to modification, variation and change without departing from the spirit thereof.

What is claimed is:

1. A composite mold comprising a plurality of individual mold sections composed of a refractory material and disposed in assembled relationship collectively defining a mold cavity, and a substantially continuous rigid self-supporting casing comprised of a fired refractory material having a coefficient of thermal expansion similar to that of the refractory material comprising said mold sections, said casing overlying at least a portion of the exterior surfaces of the assembled said mold sections and disposed in supporting interlocking engagement therewith for preventing inadvertent relative movement of said mold sections.

2. The composite mold as defined in claim 1, in which the exterior surfaces of said mold sections are formed with irregularities therealong to enhance the interlocking engagement of said casing with said mold sections.

3. The composite mold assembly as defined in claim 1, wherein said casing is formed to define a channel extending therethrough for circulating a fluid in heat transfer relationship through said casing.

4. The composite mold assembly as defined in claim 1, wherein said refractory material of which said mold sections and said casing are composed comprises particulated refractory particles bonded by a silicate binder.

5. The composite mold assembly as defined in claim 1, wherein at least one electrical heating element is embedded in said casing in controlled locations relative to the mold cavity for supplying heat to the composite mold in response to energization of said heating element.

6. The method of making a composite mold for casting metals which comprises the steps of independently forming a plurality of assemblable mold sections, assembling said mold sections in appropriate registry in a manner to define a mold cavity, encapsulating the exterior of the assembled said mold sections within a casing of a hardenable refractory potting material having a coefficient of thermal expansion similar to that of said mold sections and firing said potting material so as to form a rigid integral interlocked casing extending around at least a portion of said mold sections for retaining them in appropriate registration.

7. The method as defined in claim 6, including the further step of encapsulating said mold sections in a manner to define at least one channel extending through said composite mold adjacent to said mold cavity operable for circulating a fluid in heat transfer relationship therethrough when disposed in communication with a fluid supply source.

8. The method as defined in claim 6, including the further step of embedding a conduit in said potting material adjacent to said mold cavity for circulating a fluid in heat transfer relationship therethrough.

9. The method as defined in claim 6, further characterized in that said mold sections and said potting material are comprised of an organic silicate bonded particulate refractory material which is gelled and the composite mold assembly is subsequently fired at an elevated temperature effecting at least a partial fusion of the refractory particles in said potting material and said several mold sections.

10. The method of making castings which comprises the steps of forming a plurality of individual mold sections composed of a refractory material, assembling said mold sections in appropriate registry in a manner to collectively define a mold cavity of the desired configuration, encapsulating the exterior of the assembled said mold sections within a casing of a hardenable refractory potting material, firing said casing to form a rigid self-supporting structure having a coefficient of thermal expansion similar to that of said mold sections and forming therewith a composite mold, pre-heating said composite mold to an elevated temperature, pouring molten metal into said cavity of the pre-heated said composite mold, and thereafter extracting the solidified cast metal article from said mold cavity.

11. The method as defined in claim 10, including the further steps of encapsulating said mold sections in a manner to define at least one channel extending through said composite mold and thereafter circulating a fluid in heat transfer relationship through said channel in heat transfer relationship therewith to control the rate of solidification of the molten metal in said cavity.

12. The method of making a composite mold for casting metals which comprises the steps of:
 a. forming a plurality of individual mold sections composed of a refractory material;
 b. assembling said mold sections in appropriate registry in a manner to collectively define a mold cavity of the desired configuration;
 c. placing a flask in spaced, encircling relationship around the assembled mold sections;
 d. filling the space between said flask and said mold sections with a hardenable refractory potting material, thereby encapsulating the exterior of the assembled mold sections;
 e. hardening said potting material to achieve a final curing and fusion of the refractory particles to form a rigid, integral, high strength casing around said mold
 f. removing said flask from the periphery of the hardened refractory potting material; and
 g. pouring a molten metal into said mold cavity to effect a casting operation.

13. A method according to claim 12 wherein said hardening is achieved by firing after removal of said flask and before pouring of said molten metal.

\* \* \* \* \*